(12) United States Patent
Huang

(10) Patent No.: US 7,898,803 B2
(45) Date of Patent: Mar. 1, 2011

(54) COMPUTER CASE HAVING DETACHABLE CONTROL PANEL

(75) Inventor: Kuo-Hwa Huang, Taipei Hsien (TW)

(73) Assignee: Cooler Master Co., Ltd., Taipei Hsien (TW)

( * ) Notice: Subject to any disclaimer, the term of this patent is extended or adjusted under 35 U.S.C. 154(b) by 0 days.

(21) Appl. No.: 12/538,248

(22) Filed: Aug. 10, 2009

(65) Prior Publication Data

US 2010/0061046 A1    Mar. 11, 2010

(30) Foreign Application Priority Data

Sep. 10, 2008    (TW) .............................. 97216328 U

(51) Int. Cl.
*H05K 5/00* (2006.01)
*H05K 7/00* (2006.01)

(52) U.S. Cl. ............. 361/679.6; 361/679.4; 361/679.41

(58) Field of Classification Search ............ 361/679.02, 361/679.4, 679.41, 679.55, 679.6
See application file for complete search history.

(56) References Cited

U.S. PATENT DOCUMENTS

| | | | | |
|---|---|---|---|---|
| 6,643,126 | B2 * | 11/2003 | Su | 361/679.48 |
| 6,697,251 | B1 * | 2/2004 | Aisenberg | 361/679.09 |
| 6,922,334 | B1 * | 7/2005 | Chen | 361/679.21 |
| 7,176,898 | B2 * | 2/2007 | Litwiller | 345/173 |

* cited by examiner

*Primary Examiner* — Jayprakash N Gandhi
*Assistant Examiner* — Anthony M Haughton
(74) *Attorney, Agent, or Firm* — WPAT, PC; Justin King

(57) ABSTRACT

A computer case includes a housing and a control panel. The housing includes a first connector. The control panel is detachably connected with a side of the housing. The control panel includes a second connector corresponding to the first connector. When the control panel is connected with the housing, the second connector is electrically connected with the first connector and the control panel is enabled for implementing associated operations. Whereas, when the control panel is detached from the housing, the control panel is disabled but has a burglarproof function.

14 Claims, 3 Drawing Sheets

COMPUTER CASE HAVING DETACHABLE CONTROL PANEL

FIELD OF THE INVENTION

The present invention relates to a computer case, and more particularly to a computer case having a detachable control panel so as to achieve a burglarproof function.

BACKGROUND OF THE INVENTION

A computer case is used for installing therein the hardware components of a host computer, so that the hardware components could compute and process various data. In designing the computer case, space utilization and user-friendliness are usually taken into consideration. Generally, a control panel is arranged on the external surface of the housing of the computer case. The control panel is fixed on the external surface of the housing of the computer case. In addition, the control panel has several connecting ports. When a transmission line is plugged into one of the connecting ports, the host computer could exchange data with an external electronic device.

Conventionally, the computer case has no safety mechanism. If a transmission line is plugged into one of the connecting ports by other person, the important data stored in the host computer may be easily stolen through the connecting port and leak out. In other words, the control panel has no burglarproof function. Moreover, since the control panel is fixed on the external surface of the housing and the outward appearance of the housing is constant, the appearance and shape of the computer case are very monotonous.

Therefore, there is a need of providing an improved computer case so as to obviate the drawbacks encountered from the prior art.

SUMMARY OF THE INVENTION

It is an object of the present invention to provide a computer case having a detachable control panel. When the control panel is connected with a housing of the computer case, the second connector is electrically connected with the first connector and the control panel is enabled for implementing associated operations. Whereas, when the control panel is detached from the housing, the control panel is disabled but has a burglarproof function.

Another object of the present invention to provide a computer case having a detachable control panel, in which the user could operate some hardware components within the computer case via the control panel so as to enhance the convenience of using the computer case.

A further object of the present invention to provide a computer case having a detachable control panel, in which the control panel is permitted to be detached from the housing to be stored by the user, thereby achieving a burglarproof purpose.

Since the control panel is detachably coupled to the housing of the computer case, the user could choose a desired control panel to comply with the outward appearance of the housing. As such, the overall appearance of the computer case is diverse and aesthetically pleasing.

In accordance with an aspect of the present invention, there is provided a computer case. The computer case includes a housing and a control panel. The housing includes a first connector. The control panel is detachably connected with a side of the housing. The control panel includes a second connector corresponding to the first connector. When the control panel is connected with the housing, the second connector is electrically connected with the first connector and the control panel is enabled for implementing associated operations. Whereas, when the control panel is detached from the housing, the control panel is disabled but has a burglarproof function.

In an embodiment, the housing has a receptacle, and the control panel is accommodated within the receptacle.

In an embodiment, the housing has an opening, and the first connector is exposed to the opening.

In an embodiment, the control panel further includes at least one switch button electrically connected with the second connector.

In an embodiment, the control panel further includes at least one knob electrically connected with the second connector.

In an embodiment, the control panel further includes a connecting port electrically connected with the second connector.

In an embodiment, the connecting port is a universal serial bus (USB) connector.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
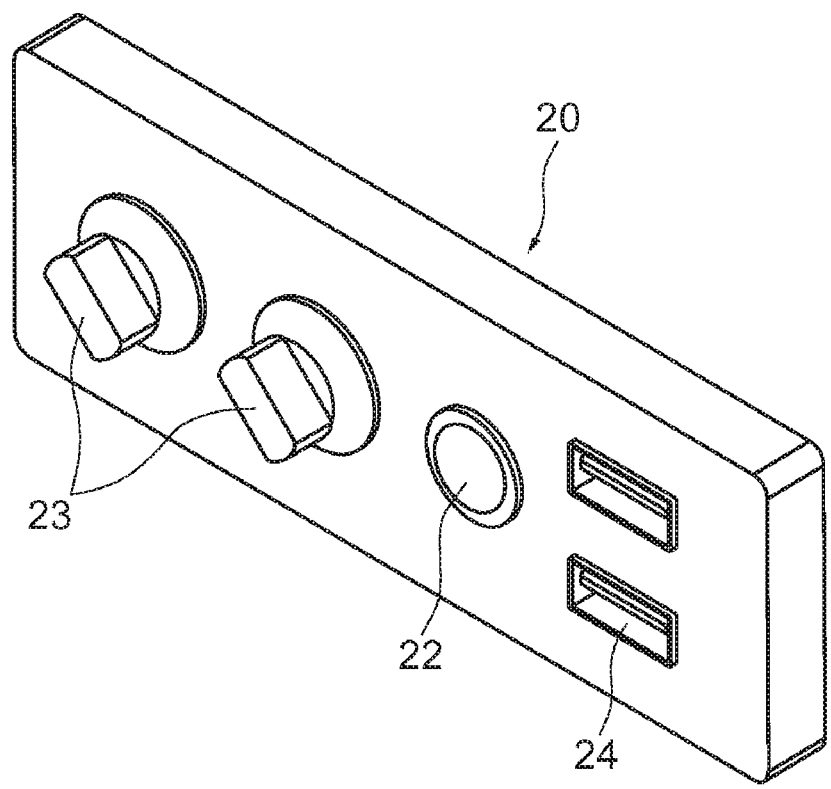
FIG. 1 is a schematic perspective view illustrating a detachable control panel according to an embodiment of the present invention.
Figure 2:
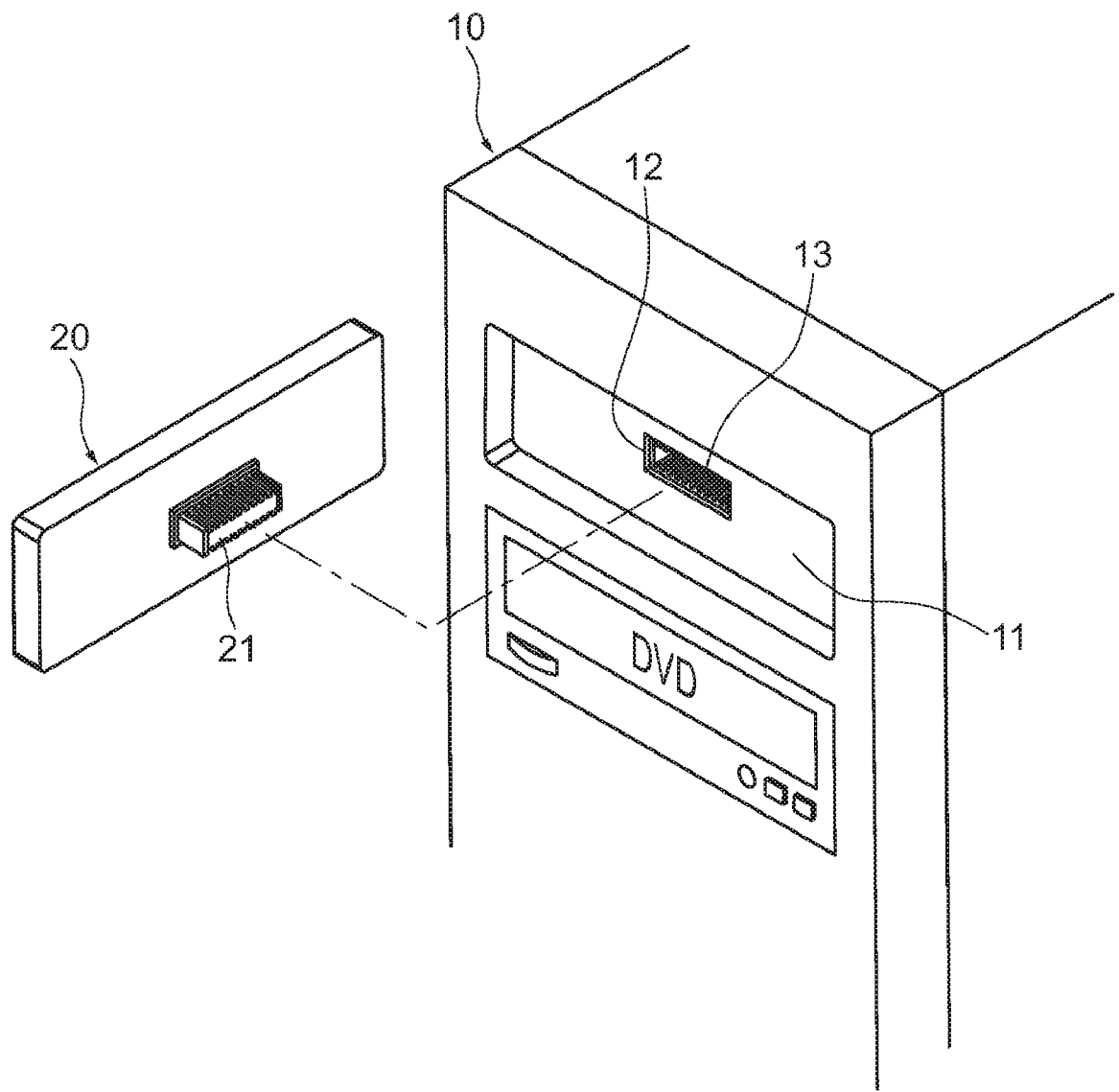
FIG. 2 is schematic exploded view illustrating a computer case having the detachable control panel of FIG. 1.
Figure 3:
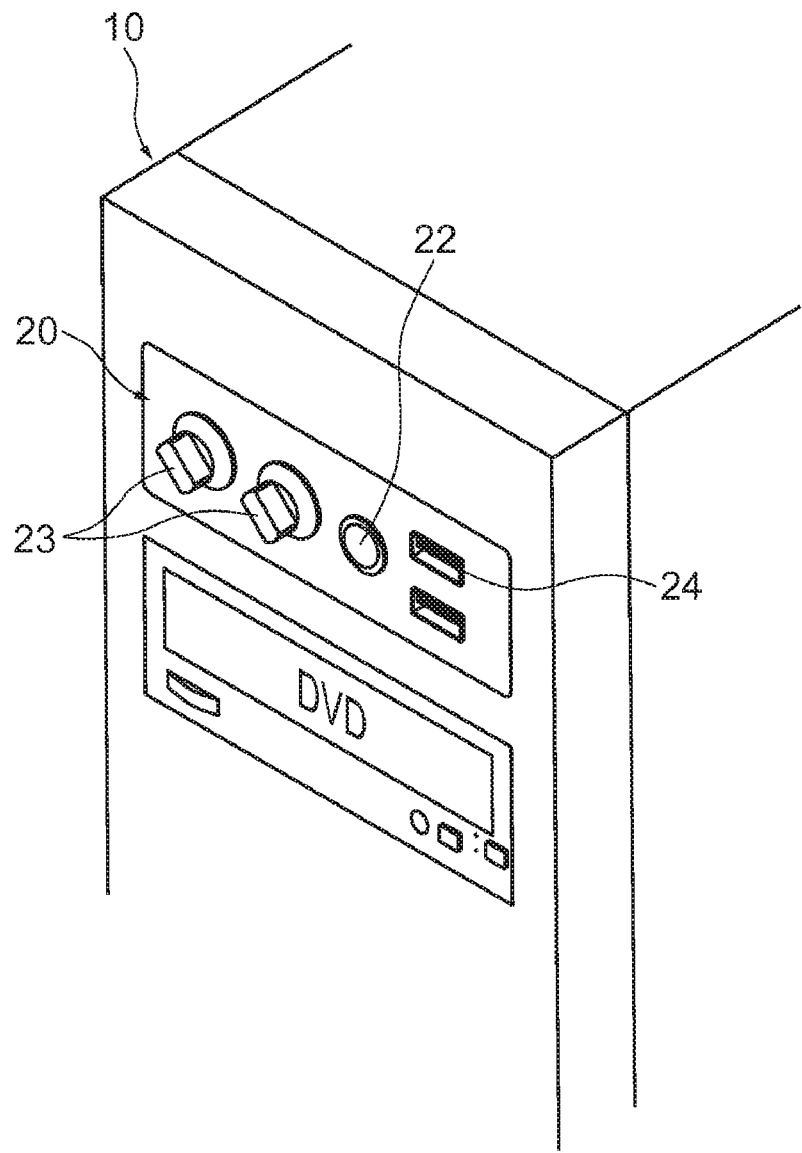
FIG. 3 is schematic assembled view illustrating the computer case of FIG. 2.

FIG. 1 is a schematic perspective view illustrating a detachable control panel according to an embodiment of the present invention. FIG. 2 is schematic exploded view illustrating a computer case having the detachable control panel of FIG. 1. FIG. 3 is schematic assembled view illustrating the computer case of FIG. 2. Hereinafter, the present invention will be illustrated in more details with reference to FIGS. 1, 2 and 3.

As shown in FIGS. 1, 2 and 3, the computer case comprises a housing 10 and a control panel 20. The housing 10 has a receptacle 11 for accommodating the control panel 20. In this embodiment, the receptacle 11 is an internally concaved recess that is formed in a front side of the housing 10. In addition, the control panel 20 and the receptacle 11 have the complementary shapes. An opening 12 is formed in an inner wall of the receptacle 11 of the housing 10. Moreover, the housing 10 has a first connector 13, which is exposed to the opening 12.

The control panel 20 comprises at least one switch button 22, at least one knob 23 and at least one connecting port 24. The types and numbers of the switch button 22, the knob 23 and the connecting port 24 are determined according to the practical requirements. In this embodiment, the control panel 20 comprises one switch button 22, two knobs 23 and two connecting ports 24. The switch button 22 is a power switch button for enabling or disenabling the power of the computer case. The knobs 23 are used for adjusting the rotating speeds of the cooling fans (not shown) that are installed within the computer case. Examples of the connecting ports 24 include but are not limited to universal serial bus (USB) connectors in order to transmit data.

Moreover, the control panel 20 has a second connector 21, which is connectable with the first connector 13 of the housing 10. In this embodiment, the second connector 21 is disposed on the backside surface of the control panel 20. It is of course that the location of the second connector 21 is not restricted. The switch button 22, the knobs 23 and the connecting ports 24 are electrically connected with the second connector 21. After the first connector 13 and the second connector 21 are coupled with each other, the switch button 22, the knobs 23 and the connecting ports 24 are electrically connected with the housing 10 through the second connector 21. The control panel 20 could be detachably coupled with the housing 10 by a fastening means or other means, and accommodated within the receptacle 11. In such manner, the computer case having a detachable control panel according to the present invention is assembled.

When the control panel 20 is integrated into the housing 10, the second connector 21 of the control panel 20 is electrically connected with the first connector 13 of the housing 10, so that the control panel 20 is electrically connected with the housing 10 to implement data transmission. Under this circumstance, the control panel 20 is enabled for implementing associated operations. For example, by depressing the switch button 22, the computer is powered on or powered off. By rotating the knob 23, the rotating speed of the cooling fans within the computer case is adjustable. In addition, when a transmission line (not shown) is plugged into the connecting port 24, the computer could exchange data with an external electronic device.

On the other hand, if the computer is not used, the control panel 20 could be detached from the housing 10. Meanwhile, the control panel 20 needs to be carefully stored and separated from the housing 10. Under this circumstance, other people fail to implement associated operations or change various settings through the control panel 20, thereby achieving a burglarproof purpose.

In the above embodiment, the housing 10 and the control panel 20 of the computer case have a first connector 13 and a second connector 21, respectively. When the control panel 20 is detachably connected with the housing 10 and the first connector 13 is coupled with the second connector 21, the user could operate some hardware components within the computer case via the control panel 20, thereby implementing associated operations. On the other hand, when the control panel 20 is separated from the housing 10, associated operations fail to be done. Meanwhile, a safety mechanism is established and the important data of the host computer are protected, thereby achieving a burglarproof purpose. For complying with the outward appearance of the housing 10, the user could choose a desired control panel 20, so that overall appearance of the computer case is diverse and aesthetically pleasing.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A computer case of a desktop computer, comprising:
a housing comprising a first connector; and
a control panel detachably connected with a side of said housing, and comprising a power switch button and a second connector corresponding to said first connector, wherein when said control panel is connected with said housing, said second connector is electrically connected with said first connector and said control panel is enabled for implementing associated operations of the desktop computer, and when said control panel is detached from said housing, said control panel is disabled for burglarproof and preventing from changing various desktop computer settings which controlled by said control panel.

2. The computer case of a desktop computer according to claim 1 wherein said housing has a receptacle, and said control panel is accommodated within said receptacle.

3. The computer case of a desktop computer according to claim 1 wherein said housing has an opening, and said first connector is exposed to said opening.

4. The computer case of a desktop computer according to claim 1 wherein said control panel further includes at least one switch button electrically connected with said second connector.

5. The computer case of a desktop computer according to claim 1 wherein said control panel further includes at least one knob electrically connected with said second connector.

6. The computer case of a desktop computer according to claim 1 wherein said control panel further includes a connecting port electrically connected with said second connector.

7. The computer case of a desktop computer according to claim 6 wherein said connecting port is a universal serial bus (USB) connector.

8. A computer case of a desktop computer comprising:
a housing comprising a first connector; and
a control panel detachably connected with a side of said housing, and comprising a power switch button and a second connector corresponding to said first connector, wherein when said control panel is connected with said housing, said second connector is electrically connected with said first connector and said control panel is enabled for implementing associated operations of the computer including powering of the computer with said power switch button, and when said control panel is detached from said housing, said control panel is disabled for implementing associated operations of the computer.

9. The computer case according to claim 8, wherein said housing has a receptacle, and said control panel is accommodated within said receptacle.

10. The computer case according to claim 8, wherein said housing has an opening, and said first connector is exposed to said opening.

11. The computer case according to claim 8, wherein said control panel further includes said power switch button electrically connected with said second connector.

12. The computer case according to claim 8, wherein said control panel further includes at least one knob electrically connected with said second connector.

13. The computer case according to claim 8, wherein said control panel further includes a connecting port electrically connected with said second connector.

14. The computer case according to claim 13, wherein said connecting port is a universal serial bus (USB) connector.

* * * * *